United States Patent
Markefka

(10) Patent No.: US 9,698,522 B2
(45) Date of Patent: Jul. 4, 2017

(54) STRAIN RELIEF ELEMENT FOR A CABLE AND PLUG WITH STRAIN RELIEF ELEMENT

(71) Applicant: Erich Jaeger GmbH & Co. KG, Friedberg (DE)

(72) Inventor: Klaus Markefka, Florstadt (DE)

(73) Assignee: Erich Jaeger GmbH & Co. KG, Friedberg (DE)

( * ) Notice: Subject to any disclaimer, the term of this patent is extended or adjusted under 35 U.S.C. 154(b) by 9 days.

(21) Appl. No.: 14/728,179

(22) Filed: Jun. 2, 2015

(65) Prior Publication Data
US 2016/0336682 A1    Nov. 17, 2016

(30) Foreign Application Priority Data
May 15, 2015   (EP) ...................................... 15167778

(51) Int. Cl.
*H02G 3/04*     (2006.01)
*H01R 13/58*    (2006.01)
*H01R 13/50*    (2006.01)

(52) U.S. Cl.
CPC ....... *H01R 13/582* (2013.01); *H01R 13/5804* (2013.01); *H01R 13/501* (2013.01)

(58) Field of Classification Search
CPC .................................................. H01R 13/582
(Continued)

(56) References Cited

U.S. PATENT DOCUMENTS 3,711,632 A * 1/1973 Ghirardi .................. H02G 3/06
                                                  174/135
4,723,053 A   2/1988 Amaya
(Continued)

FOREIGN PATENT DOCUMENTS

DE    102005030554 A1    12/2006
DE    202009015571 U1     3/2011
(Continued)

OTHER PUBLICATIONS

Extended European Search Report issued in European Patent Application No. 15167778.8 dated Nov. 9, 2015.
(Continued)

*Primary Examiner* — Abdullah Riyami
*Assistant Examiner* — Nelson R Burgos-Guntin
(74) *Attorney, Agent, or Firm* — McDonnell Boehnen Hulbert & Berghoff LLP

(57) ABSTRACT

A strain relief element for a cable. The strain relief element has a clamping collar in form of an at least partially closing ring for clamping the cable sheathing arranged in a clamping opening of the ring. The clamping collar having first and second half-ring clamping elements with a partial clamping opening each and hinged together through a first hinge. The clamping opening being defined by the two half-ring clamping elements folded towards each other and fixed with a clamping force executed by a clamping element. The strain relief element has a fixing collar means in form of an at least partially closing ring for fixing a corrugated tube surrounding the cable arranged in a fixing opening of the ring, the fixing collar having first and second half-ring fixing elements with a partial fixing opening each and hinged together through a second hinge.

15 Claims, 6 Drawing Sheets

(58) Field of Classification Search
USPC .................. 439/469, 462, 455; 174/72 A
See application file for complete search history.

(56) References Cited

U.S. PATENT DOCUMENTS

| | | | | |
|---|---|---|---|---|
| 5,046,766 | A * | 9/1991 | Lomberty | F16L 25/0036 |
| | | | | 174/92 |
| 5,538,438 | A * | 7/1996 | Orlando | H01R 13/506 |
| | | | | 439/344 |
| 5,588,870 | A | 12/1996 | Boteler et al. | |
| 6,595,473 | B2 * | 7/2003 | Aoki | B60R 16/0215 |
| | | | | 138/108 |
| 6,627,817 | B1 * | 9/2003 | Kortenbach | H02G 3/083 |
| | | | | 174/541 |
| 6,668,865 | B2 * | 12/2003 | Miyamoto | B60R 16/0215 |
| | | | | 138/108 |
| 6,875,918 | B2 * | 4/2005 | Sudo | H02G 3/06 |
| | | | | 138/108 |
| 7,119,275 | B2 * | 10/2006 | Suzuki | H02G 3/0691 |
| | | | | 138/108 |
| 7,503,776 | B1 * | 3/2009 | Pavlovic | H01R 4/46 |
| | | | | 439/455 |
| 7,581,564 | B2 * | 9/2009 | Tanaka | F16L 21/06 |
| | | | | 138/110 |
| 7,824,213 | B1 * | 11/2010 | Korcz | H01R 13/5816 |
| | | | | 174/64 |
| 8,002,574 | B1 * | 8/2011 | Yi | H01R 13/582 |
| | | | | 439/455 |
| 8,764,485 | B2 | 7/2014 | Hohner et al. | |
| 2004/0187258 | A1 | 9/2004 | Tsuji | |
| 2008/0179469 | A1 * | 7/2008 | Leone | H02G 3/0658 |
| | | | | 248/56 |
| 2009/0035987 | A1 | 2/2009 | Daly et al. | |
| 2013/0102185 | A1 | 4/2013 | Mulfinger et al. | |
| 2014/0242840 | A1 * | 8/2014 | Dang | H01R 13/6461 |
| | | | | 439/607.01 |

FOREIGN PATENT DOCUMENTS

| | | |
|---|---|---|
| EP | 2105996 A1 | 9/2009 |
| JP | H10284172 A | 10/1998 |
| WO | 2007112771 A1 | 10/2007 |
| WO | 2007113307 A1 | 10/2007 |
| WO | 2013018368 A1 | 2/2013 |

OTHER PUBLICATIONS

English Translation of Abstract of German Patent Application No. DE 10 2005 030 554 dated Nov. 8, 2016.

* cited by examiner

STRAIN RELIEF ELEMENT FOR A CABLE AND PLUG WITH STRAIN RELIEF ELEMENT

CROSS REFERENCE TO RELATED APPLICATIONS

The present application claims the benefit of European Patent Application No. 15167778.8 filed May 15, 2015 the entire contents of which are incorporated entirely herein by reference.

BACKGROUND

The invention relates to a strain relief element for a cable having one or more conductors, and a respective plug with said strain relief element.

Each conductor in the cable is covered by an insulating, and a cable sheathing is surrounding and fixing the one more insulated conductors. In case of one single insulated conductor, the cable sheathing and the insulating of the conductor can be formed by one integral part surrounding the conductor or by an additional cover different from the insulating of the conductor. In case of a plurality of different insulated conductors, the cable sheathing is preferably an additional cover surrounding all inductors, e.g. as a plastic coating manufactured around the insulated conductors or as a tape, such as a fabric tape, wrapping the insulated conductors. The cable sheathing is thus a means for surrounding the plurality of insulated conductors and fixing them close to each other to form a cable.

The cable further has a corrugated tube surrounding the cable sheathing along its longitudinal direction at least partially. Partially surrounding means that the corrugated tube is surrounding the cable sheathing in such way that at least one end or section of the cable sheathing is protruding from the corrugated tube. This at least one end or section of the cable sheathing protruding the corrugated tube might in particular be a connection part of the cable that might be housed in a plug, socket or the like connection means. The part of the cable with the cable sheathing protruding the corrugated tube is usually at an end of the cable. However, this part of the cable might also be an intermediate section of the cable without the corrugated tube.

A strain relief element is attached to the cable and hold in the plug, socket or the like connection means. It is fixing the cable, or at least the conductor or conductors relative to the housing of the plug, socket or the like connection means against a tractive force executed on the cable relative to the plug, socket or the like connection means. The aim of such strain relief elements is to protect the electrical connection of the conductor or conductors to the plug, socket or the like connection means, and in particular to a contact insert thereof, against damage form such tractive force. Such strain relief elements are commonly known and used.

Such strain relief elements are often integrated into the plug, socket or the like connection means as an integral part. It is known form DE 10 2005 030 554 A1 to integrate such strain relief elements into the cable opening of the plug composed of two half-body elements or shells. When the two half-body elements are assembled, the strain relief element is formed clamming the cable sheathing with a clamping force. The clamming force might be reinforced by an additional clamping element, such as a cable tie. However, the handling is quite complicated as the strain relief element must be fixed or attached at the cable when the housing of the plug is assembled.

The proposed strain relief element has a clamping collar means in form of an at least partially closing ring for clamping said cable sheathing arranged in a clamping opening of the ring. The clamping takes place in particular at a part of the cable sheathing protruding the corrugated tube. The clamping collar means provides a first and a second half-ring clamping element with a partial clamping opening each and hinged together through a first hinge. The clamping opening is defined by folding the two half-ring clamping elements towards each other around the first hinge. In this case, the partial clamping openings of the two half-ring elements form a ring around the cable sheathing. The clamping opening is fixed around the cable sheathing with a clamping force executed by a clamping element. The ring defined by the clamping collar means might be completely closed. However, according to an advantageous embodiment, the ring comprises a gap. This means that the ring is surrounding the cable sheathing apart from this remaining gap. This gap is preferably significantly smaller than the outer diameter of the cable sheathing with the effect that the cable is secured inside the ring and cannot be pulled through the gap. This is described by the fixing collar means forming a partially closing ring.

In the WO 2007/113307 A1 a cable connector assembly for a cable is described that having a similar strain relief element with first and second separate shells. Both shells connected together to form the housing of the connector assembly. The cable is positioned between the two shells before assembling the housing. In the part of the cable surrounded by the two shells, a strain relief means is tightly surrounding a segment of the insulating sheath of the cable. The strain relief means comprises at least first and second portions hinged together. When folded towards each other, the first and second portions surround the cable entirely and are fixed by a snap fit connection. It is a disadvantage of this cable connector assembly that a protecting corrugated tube surrounding the cable sheathing cannot be attached the connector assembly. Thus, during use, the corrugated tube might misalign on the cable sheathing relative to the connector assembly with the effect that the cable sheathing is not protected by the corrugated tube and thus exposed to a possible damage.

The DE 20 2009 015 571 U1 discloses a an electrical plug with a separate adapter part with an outer surface adapted to an inner surface of the plug housing and with an inner surface structure adapted to be attached to the sheathing of the cable, the sheathing being in form of a corrugated tube. The adapter part has two half-shells hinged to an adapter part body. The major drawback of this disclosure is that the conductors contained in the corrugated tube are not secured or clamped. Accordingly, this solution can only be used to attach the corrugated tube to the plug but not as strain relief element. It is not possible to execute a high clamping force to the corrugated tube without damaging the corrugated tube and/or the conductors guided in the corrugated tube.

Same applies for a similar adapter for fixing a corrugated tube disclosed in US 2004/0187258 A1 having a main body and a lid coupled via a bendable hinge to hold a corrugated tube surrounding a cable. A strain-relief of a cable guided in the corrugated tube is not possible.

It is accordingly an object of the present invention to provide a strain relief element that enables to fix a corrugated tube surrounding the cable sheathing of the cable and that is to handle for both, fixing the corrugated tube and attaching the strain-relief element to the cable.

This object is achieved with a strain relief element according to claim 1 and a plug with that strain relief element according to claim 13.

BRIEF SUMMARY

According to the invention it is provided that the strain relief element as described before further has a fixing collar means in form of an at least partially closing ring for fixing said corrugated tube arranged in a fixing opening of the ring. The fixing collar means has first and second half-ring fixing elements with a partial fixing opening each and hinged together through a second hinge. The fixing opening is defined by two half-ring clamping elements when they are folded towards each other around the second hinge and fixed with a fixing force executed by a fixing element. In line with the invention, the clamping collar means and the fixing collar means are attached to each other by a connection web connecting the first half-ring clamping element and the first half-ring fixing element such that the center axis of the partial fixing opening in the first half-ring fixing element and the center axis of the partial clamping opening in the first half-ring clamping element are a joint or common axis. In other words, the center axis of the partial fixing opening in the first half-ring fixing element and the center axis of the partial clamping opening in the first half-ring clamping element coincidence with each other.

As a result, the cable can be laid into the first half-ring clamping element and the first half ring fixing element such that a part or portion of the cable with the cable sheathing protruding the corrugated tube, i.e. without the corrugated tube surrounding the cable sheathing, is positioned in the partial clamping opening of first half-ring clamping element and that a part or portion of the cable with the corrugated tube surrounding the cable sheathing is positioned in the partial fixing opening of the first half-ring fixing element. As the center axis of the partial fixing opening in the first half-ring fixing element and the center axis of the partial clamping opening in the first half-ring clamping element coincidence with each other, the cable axis or direction can simply follow this direction. Accordingly, the cable can easily be inserted into the partial fixing opening in the first half-ring fixing element and into the partial clamping opening in the first half-ring clamping element (with the respecting parts or portions of the cable with and without the corrugated tube surrounding the cable sheathing). Accordingly, it is very easy to put the cable into the first half-ring clamping element and the first half ring fixing element.

Then, the second half-ring fixing element is folded or clapped around the second hinge, and the two half ring elements are fixed at each other with a fixing force executed by the fixing element. In this position, the two half-ring fixing elements form the at least partially closing ring. In a following step, also the second half-ring clamping element is folded or clapped around the first hinge, and the two half-ring elements are fixed at each other with a clamping force executed by the clamping element. In this position, also these two half-ring clamping elements form the at least partially closing ring.

This ring (of the fixing collar means and/or the clamping collar means) can be provided as partially closing ring meaning that the ring might not be completely closed but have a gap in between the open ends of the two half-ring elements (i.e. the two half-ring fixing elements and/or the two half ring clamping elements). This gap enables an adaption of the inner diameter of the (only partially) closed ring (forming the fixing or clamping opening, respectively) to the outer parameter of the cable (i.e. of the corrugated tube or the cable sheathing, respectively) by adjusting the size of the remaining gap. The adjustability of the gap size also allows to adjust the fixing and/or clamping force actuated by the fixing and/or clamping element. The higher the applied fixing or clamping force is the more closes the remaining gap between the two respective half-ring elements thereby reducing the remaining inner diameter of the ring element and reinforcing the jamming of the cable parts or portions contained between the two respective half-ring elements.

Accordingly, the applied fixing force is or can be chosen sufficient to fix the corrugated tube of the cable in the ring of the fixing collar means and/or to clamp the cable sheathing in the clamping collar means.

Preferably, the fixing element is an integrated part of the fixing collar means fixing the two half-ring fixing elements at each other upon folding the second half-ring fixing element towards to first half-ring fixing element. The fixing element can be a form-locked join, for example. This ensures easy and, in particular, one-hand actuation, of the fixing element.

Major advantages of the strain relief element according to the invention is that—after this mounting step of fixing the fixing collar means to the corrugated tube—the entire strain relief element is attached to the cable and that the section of the cable sheathing (without the corrugated tube surrounding it) is already positioned in the clamping collar means for applying the desired clamping force of the strain relief element to the cable sheathing and the conductors surrounded by the cable sheathing in the following mounting step.

In the following mounting step of the strain relief element according to the invention, the second half-ring clamping element is folded or clapped around the first hinge until the partial clamping openings of the first and the second half-ring elements engage the cable sheathing. Preferably and as already explained, in this position of the first and the second half-ring elements, there remains a gap in the ring of the clamping collar means having the effect that the ring of the clamping collar means is only a partially closing ring. Then, the clamping element is actuated in order to apply the desired clamping force to the cable, or more precisely to the cable sheathing. By applying a force sufficiently high, the cable and in particular the—to some extend flexible—cable sheathing are compressed thus fixing the conductors in the cable relative to the strain relief element. By holding the strain relief element e.g. in a plug, socket or the like connection means, it is able to secure the position of the conductors of the cable relative of the casing of the plug, socket or the like connection means and to protect the electrical connection of the conductors in the casing to, e.g., a contact insert against a tractive force acting if the cable is pulled relative to the casing. Besides a protection against tractive forces, the clamping collar means acts upon actuation of the clamping elements also as a lock against rotation of the cable and the insulated conductors, respectively, relative to the plug, socket or the like connection means. This is important as a multiple rotation of a contact might pull the contact out of the contact insert of the plug, socket or the like connection means. Further, by a rotation of the cable or conductors relative to the contacts fixed in the contact insert, the insulated conductor might be damaged or cut through.

Often, the actuation of the clamping element requires some more elevated handling of the clamping element. Therefore, it is one major advantage of the proposed invention that the strain relief element as a whole is or can be fixedly attached to the cable in a correct actuation position before actuating the clamping element and applying the clamping force to the cable sheathing.

Preferably, the clamping element is a separated part from the clamping collar means fixing the two half-ring elements. This means that the clamping element is not integrally formed at one or both half-ring elements but as a separate part engaging both half-ring elements when attached to the clamping collar means in order to execute the clamping force to the both half-ring elements. Possible embodiments are clamps or binders, e.g. a cable tie being adjustable with a huge variability.

In an alternative embodiment, the clamping element might also be fixedly attached to the clamping collar means. A simple and known embodiment might be, for example, a screw rotatably fixed or fixable at one half-ring clamping element and a corresponding thread provided in the other half-ring clamping element. The screw can then be screwed into the thread thereby applying a closing force to both half-ring clamping elements folded or clapped towards each other. This clamping element is in this alternative embodiment an integral part of the clamping collar means.

After mounting the clamping element as described before, the strain relief element is attached to the cable. Both, the cable and the strain relief element form thus one entity and can be inserted as this one entity into the body of a plug, socket or the like connection means. In this body of the plug or the like, the strain relief element fixed to the cable can be housed in a respective cavity of the body. This cavity has at least one axial stopper to fix the strain relief element axially in the body. Axially fixing means in this context that the strain relief element is fixed in the direction of the cable to which the strain relief element is attached as described before. Further, a protection against rotation is achieved.

Thus, a strain relief element is proposed that allows an easy handling while mounting and ensures high protection against pulling the cable connected to the electrical contact insert, e.g. in a plug or socket, or any electrical connection.

It is to be emphasized that the ring form of the collar means or of the half-ring elements is not limited to an annular or partially annular form, even if this is considered a preferred embodiment as there is no distinguished orientation of a annular (round) strain relief element attached to the cable. This allows a huge variability during mounting. A ring is considered to be an element that is surrounding an inner opening essentially completely, irrespective of the form of the ring. The inner opening can be used as fixing or clamping opening as described. The ring might comprise a gap so that the ring is not completely closed.

According to a preferred embodiment of the invention, the first hinge and the second hinge have the same bending direction. The bending direction of each of the first and second hinge can in particular be parallel to the common center axis of the partial fixing opening and the partial clamping opening. Accordingly, both second half-ring elements are folded or clapped to the same direction. This arrangement and direction of the first and second hinge allows to attach the fixing collar means and the clamping collar means in separate mounting steps while each collar means comprises only two half-ring elements hinged to each other.

The fixing element of the first and second half-ring clamping elements can preferably be a catch-notch-connection having a catch at one of the first or second half-ring fixing elements and a respective notch at the other of the first or second half-ring fixing elements. The catch might be arranged tangentially to the ring form of the one fixing half-ring element and protrude from or with respect to abutting face of the one fixing half-ring element such that said catch snaps behind the other fixing half-ring element and engages the notch arranged on this other fixing half-ring element. This is a preferred embodiment of the invention. The abutting face of the fixing half-ring element is the open end of the half-ring element opposite to the end adjacent to the second hinge.

According to a preferred advancement of this aspect, the notch might provide more than one, preferably between two to five, in particular for example three, notch positions in order to allow the fixing collar means being adjusted to the diameter of the corrugated tube. Adjusting the fixing collar means to the corrugated tube implies in particular that the opening of the fixing collar means defined by the ring has an inner diameter corresponding to outer diameter of the corrugated tube without applying a destructive clamping force to the corrugated tube.

In order to enhance the fixing of the corrugated tube there might be fixing ridges provided in line with the invention protruding from the surface of the partial fixing openings in the first and/or second half-ring fixing elements wherein the direction of each fixing ridge preferably defines a plane perpendicular to the center axis of the partial fixing opening. In this arrangement, there is provided a nut between two adjacent fixing ridges into which a crest of the corrugated tube is insertable. Corresponding fixing ridges in the first and the second half-ring element are preferably defined in the same plane which is directed perpendicular.

By inserting the positive crest of the corrugated tube (directed towards the outside of the corrugated tube) into the nut between two adjacent ridges, the corrugated tube is fixed axially in the fixing collar means even without executing a jamming force on the corrugated tube leading to a possible deformation or damaging of the corrugated tube in radial direction. The fixing in axial direction is performed by the crest of the corrugated tube abutting against the side surfaces of the ridges when the corrugated tube is moved in direction of the center axis (i.e. the direction of the cable). This is a simple form fit without any component of a frictional connection applying a deforming force to the corrugated tube.

Preferably, more than two fixing ridges are provided in each of the half-ring fixing elements. In an advantageous embodiment, 3 or 4 fixing ridges are arranged adjacent to each other thus defining 2 or 3 nuts, respectively, between the fixing ridges. These 2 or 3 nuts are sufficient to fix the corrugated tube at the fixing collar means.

Similarly, it can be provided in line with an embodiment of the invention that clamping ridges are provided protruding from the surface of the partial clamping openings in the first and/or second half-ring clamping elements wherein the direction of each clamping ridge preferably defines a plane perpendicular to the center axis of the partial clamping opening. Preferably, the clamping ridge has a triangular cross section with the tip of the triangular directed into the partial clamping opening of the half-ring element. When folding the two half-ring clamping elements towards each other, the ridges (in particular the tip of the triangular like formed ridges) engage the cable sheathing first. By applying a clamping force to the two half-ring elements with the clamping element, the ridges are pressed into the cable sheathing thereby deforming the cable sheathing and/or the insulating of the conductor or conductors locally. In this state the cable is secured against a pulling force in axial cable direction and a rotation relative to the contacts fixed in the plug, socket or the like connection means. Accordingly, the ridges also act as an additional protection against rotation.

Preferably, at least two ridges are provided adjacent to each other in each half-ring clamping element. With respect to the axial direction of the partial clamping opening (i.e. the direction of the center axis), the ridges in the two half-ring elements can be arranged in the same position. Then, two ridges are pressed into the cable sheathing at the same axial position from two opposing sites. This arrangement ensures strong clamping force and high strain relief efficiency. Of course, it is possible in line with the invention to dispose the ridges in the two half-ring elements with an axial offset relative to each other or to provide ridges only in one of the two half-ring elements.

A preferred separate clamping element according to the invention is a cable tie. This is an easy to handle, cheap clamping element that can be renewed simply by cutting through the cable tie and using a new cable tie. Further, the clamping force can be adjusted in narrow steps. Cable ties are commercially available in a variety of different sizes and qualities so that the one skilled in the art can choose an appropriate cable tie as clamping element.

In order to have an effective guide for the clamping element being in particular a separated part from the clamping collar means, the half-ring clamping elements can be composed of a wall defining the partial clamping opening and two side walls directed essentially perpendicular thereto. The (inner) surface of the wall defining the partial clamping opening is preferably directed in parallel to the center axis of the partial clamping opening. The two side walls are disposed at the two axial ends of the surface (in direction of the center axis of the partial clamping opening) and extend radially outward from wall surface (i.e. away from the partial clamping opening or, in other words, from the center axis). Accordingly, there is formed a nut between the side walls and the (outer) surface of the wall defining (with its inner surface) the partial clamping opening. This nut is suited to guide the clamping element, e.g. the cable tie. The (closed) clamping element (actuating the clamping force) is thus well secured to the clamping collar means.

In order to facilitate the installation of the clamping element to the clamping collar means, and in particular the installation in the before described nut of the clamping collar means, an access recess can be provided in the side walls of preferably each half-ring clamping element. The access recess is positioned preferably adjacent to the first hinge combining the first and the second half-ring clamping elements. The access recess is formed such that the side edge of the side wall (defining one border of the access recess) is not directed radially to the center axis of the partial clamping opening, but in an angle of about 70° thereto. The angle of about 70° shall cover a rage of about 50° to about 90°. In other words, the edge of the side walls adjacent to the first hinge is not directed radially with respect to the center axis of the partial clamping opening, but in an angle of about 70° thereto cutting a basically triangular-formed part from the side wall. After folding the two half-ring clamping elements towards each other there mains an access recess or space in the side walls allowing to place the fastening element of the clamping element in this access recess. This improves the handling of the clamping element while installing the clamping element at the two half-ring clamping elements. In case of a cable tie, the fastening element can be hold by the user while pulling the open end of the cable tie through the fastening element. It is thus easy to apply the desired clamping force. Further, after having fixed the cable tie to the strain relief element, the open end of the cable tie protruding from the fasting element can easily be cut off.

One further advantage of this arrangement is that the fastening element of the clamping element does not significantly radially protrude from the outer edge of the side wall (in a section of the side wall without recess). Accordingly, the strain relief element with mounted clamping element is very compact.

9. Strain relief element according to any of the preceding claims, characterized in that the first hinge is arranged at an axially directed edge of the partial clamping opening. In other words, the first hinge is disposed at the outer surface of the wall defining (with its inner surface) the partial clamping opening along the direction of the center axis. Accordingly, it is disposed at the intersection of the inner edge of the side wall and the side edge of the side wall. In this arrangement, the before described access recess of the side walls of the first and/or second half-ring clamping elements allows to fold the two half-ring clamping elements away from each other until the corresponding side edges of the side walls abut against each other. The folding axis of the first hinge is thus positioned close to the surface of the clamping opening (or the surface of the two partial clamping openings).

It is advantageous to provide the size of the access recess such that the two half-ring clamping elements can be folded away from each other by an angle of about 180°.

In this preferred embodiment, the mounted clamping element is also covering the first hinge fixing the two half-ring clamping elements folded together without any resulting force on the first hinge. Accordingly, the first hinge is secured against damage or breaking while the (potentially quite high) clamping force is applied.

In particular in such an arrangement it is sufficient to form the first hinge and/or the second hinge as an integral hinge. This allows an easy and cheap production of the strain relief element, as the internal hinge (film hinge) is composed of the same material as the rest of the strain relief element. The use of an internal first and/or second hinge is possible, as the first hinge can be protected against high breaking forces by the clamping element surrounding the entire clamping collar means with the first hinge connecting the first and the second half-ring clamping elements when the clamping force is applied. The fixing force of the fixing collar means does, as described with respect to a preferred embodiment, act substantially in axial direction of the fixing opening defined by the two partial fixing openings. Accordingly, an internal hinge does resist the (quite low) breaking forces applied form the fixing collar means during use.

In another preferred aspect of the present invention, the connection web is disposed between the first half-ring clamping element and the first half-ring fixing element adjacent to the partial clamping and fixing opening, respectively. Preferably, the connection web is connecting one side wall of the clamping collar means with the respective opposing side wall of the fixing collar means. In the circumferential direction along the partial clamping and fixing openings, respectively, the connection web is disposed in the middle of the partial clamping and fixing openings. This enhances the stability of the entire strain relief element. Apart from this connection web, there is according to a preferred embodiment no other part disposed between the opposing side walls of the respective half-ring clamping and fixing elements. Accordingly, there can be provided an axial stopper in the cavity of the body of the plug, socket or the like connection means between these two side walls. The axial stopper has a recess for the connection web.

Preferably, the strain relief element can be injection molded in one single piece (excluding, if applicable, the external clamping element, such as a commercially available cable tie). A suited material is polyamide plastic (PA), polypropylene (PP) or polybutylene terephthalate (PBT). Injection molding is a cheap and easy-to-handle production method.

The invention further relates to a plug defined in claim 13 having the strain relief element as described before or parts thereof. Accordingly, the invention describes a plug for a cable having one or more conductors, each conductor covered by an insulating and a cable sheathing surrounding and fixing said at least one insulated conductor or said more insulated conductors, said cable having further a corrugated tube surrounding the cable sheathing along its longitudinal direction at least partially. The body of the plug is composed of two half-body elements attachable to each other, each half-body element having a partial cavity for inserting (part of) an electrical insert (as electrical contact element to engage with a socket, counter-plug or the like) and a partial cavity for inserting (part of) a strain relief element. A partial cavity for inserting means that the contact element and the strain relief element are housed in the (entire) cavity composed of the partial cavities of the two half-body elements when the two half-body elements are assembled to the plug. While assembling the plug, the electrical insert is preferably connected to the conductors of the cable.

Each half-body element further has a partial cable opening and a partial connection opening. Similar to the partial cavity, the (entire) cable opening is composed of the partial cable openings and the (entire) connection opening is composed of the partial connection openings when the two half-body elements are assembled to the plug. The partial connection openings and the partial cable openings of the half-body elements are disposed on opposing axial ends of the half-body elements.

The plug further comprises a strain relief element as claimed in any of the claims 1 to 12 and axial stoppers disposed in the partial cavities of the half-body elements axially fixing the strain relief element when inserted into the half-cavities of the half-body elements, wherein the axial stoppers comprise a stopper recess in the central axis of the plug for conducting the cable.

The axis of the plug is defined by a line connecting the center of the cable opening to the center of the connection opening. The cable opening is used for conducting the cable into the plug to electrically connect with the electrical insert, and the connection opening is used for plugging the electrical connection element of the plug into a socket (or more generally a counter-plug) to have an electrical connection between the plug and the counter plug.

Preferably, the two half-body elements of the plug are connected by a third hinge disposed along one axial edge of the two half-body elements, respectively. The advantage of such a third hinge is that the two half-body elements of the plug are already fixed to each other when the cable with the attached strain relief element and the attached contact insert are mounted in the half-body elements of the plug. For assembling the plug, the two half-body elements can be folded together easily thus housing the cable with the strain relief element and the contact insert in the respective housings. The particular advantage is the strain relief element with the clamping collar means for the strain relief and the fixing collar element for the fixing of the corrugated tube are already completely fixed to the cable when assembling the plug. Assembling the plug thus only means to insert the cable with the already mounted strain relief element and contact insert in the respective cavities of the plug and folding the two half-body elements of the plug towards each other. The third hinge might also be a third hinge. This might be arranged along essentially the entire axial direction of the plug.

For fixing the open edges of the two half-body elements (i.e. the edges opposing the edges adjacent to the third hinge, the two half-body elements have a snap fit to attach the axial edge of the half-body elements opposed to the third hinge with each other when the two half-body elements are folded around the third hinge towards to each other. This allows an assembly of plug without further tooling equipment.

Further features, advantages and applications of the proposed invention will also become apparent from the following disclosure of a preferred embodiment and the drawing. All features mentioned or shown are part of the invention irrespective of their mention or aggregation in the claims or the reference of the claims.

DETAILED DESCRIPTION

Figure 1:
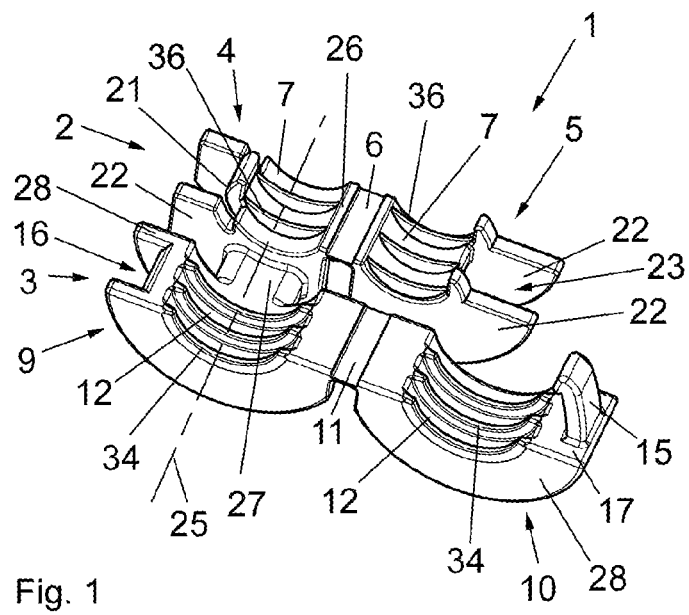
FIG. 1 shows a preferred embodiment of a strain relief element of the invention with an opened clamping collar means and an opende fixing collar means in a three-dimensional front view on the partial clamping and fixing openings.

FIG. 1 shows a strain relief element 1 according to a preferred embodiment of the invention. The strain relief element 1 has a clamping collar 2 means for clamping a cable to achieve a strain relief and a fixing collar means 3 for fixing a corrugated tube of the cable.

The clamping collar means 2 has a first half-ring clamping element 4 and a second half-ring clamping element 5. Both first and second half-ring clamping elements 4, 5 are hinged together through a first hinge 6. Each of the half-ring clamping elements 4, 5 has a partial clamping opening 7. When the two half-ring clamping elements 4, 5 are folded towards each other around the first hinge 6, the two partial clamping openings 7 form a clamping opening 8 as evident from FIG. 3. Then, the clamping collar means 2 has the form of closed or at least a partially closed ring for clamping a cable arranged in a clamping opening 8 of the ring. This will be explained in more detail later with reference to FIG. 5.

The fixing collar means 3 has, in similar way, a first half-ring fixing element 9 and a second half-ring fixing element 10. Both half-ring fixing elements 9, 10 are hinged together through a second hinge 11. Further, both half-ring fixing elements 9, 10 have partial fixing openings 12. When the two half-ring fixing elements 9, 10 are folded towards each other around the second hinge 11, the two partial fixing openings 12 build a fixing opening 13 of the fixing collar means 3 for fixing a corrugated tube of the cable. The fixing collar means 3 then has the form of a closed or partially closed ring surrounding the fixing opening 13. This will be explained in more detail later with respect to FIG. 5.

Figure 2:
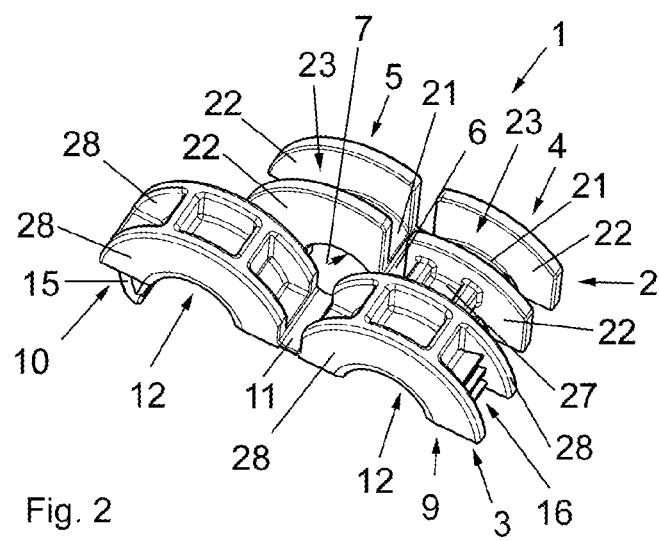
FIG. 2 shows a three-dimensional rear view of the strain relief element according to FIG. 1.
Figure 4:
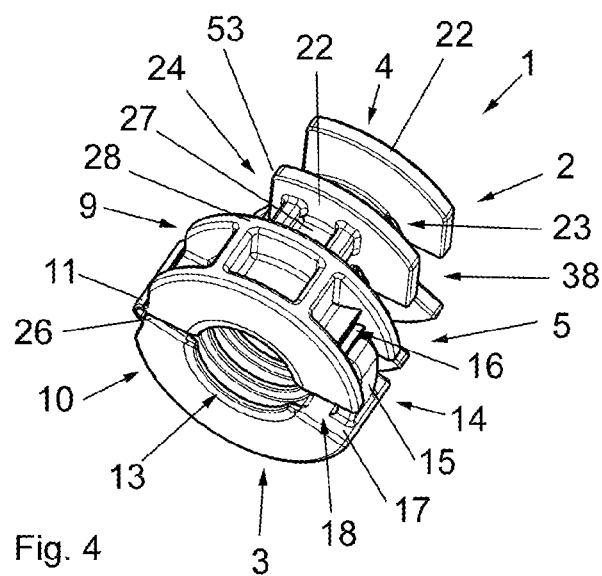
FIG. 4 shows the view of FIG. 2 with closed clamping and fixing collar means.

The two half-ring fixing elements 9, 10 folded together are fixed at each other with a fixing force executed by a fixing element 14 as evident from FIG. 4. The fixing element 14 of the first and second half-ring fixing elements 9, 10 is a catch-notch-connection having a catch 15 at the second half-ring fixing element 10 and a respective notch at the first half-ring fixing element 9. The catch 15 is arranged tangentially to the ring form of the half-ring fixing element 10 and protrudes from an abutting face 17 of the second half-ring fixing element 10 such that the catch 15 snaps behind the first half-ring fixing element 9 when the two half-ring fixing elements 9, 10 are folded together. Then, the catch 15 engages the notch 16 arranged on the first half-ring fixing element 9. As evident from FIG. 2, the notch 16 provides three notch positions. There can remain a gap 18 in the ring of a fixing collar means 3 when the catch 15 engages a notch position of notch 16, as shown in FIG. 4.

For fixing the two half-ring clamping elements 4, 5 at each other when they are folded together, there is provided an external clamping element 19 according to a preferred embodiment of the invention. According to the preferred embodiment, the clamping element 19 is a cable tie 20 as later explained more in detail with respect to FIG. 6.

As an external clamping element 19, it is not integrally formed with the strain relief element 1 or the clamping collar means 2, respectively. Being a separated part from the clamping collar means 2, it is useful to guide the clamping element 19 when it is attached to the clamping collar means 2. To this aim the half-ring clamping elements 4, 5 are composed of a wall 21 defining with its inner surface the partial clamping opening 7 and two side walls 22 directed essentially perpendicular to the wall 21 and extending radially outwards from this wall 21. This means that an inner edge 52 of both side walls 22 is connected to the one or the other axial edge of the wall 21, respectively, and the outer edge 54 is extending to the side opposite to the inner surface of wall 21. Accordingly, there is formed a nut 23 between a side wall 22 and the outer surface of the wall 21. This nut 12 is suited to guide the clamping element 19.

Figure 3:
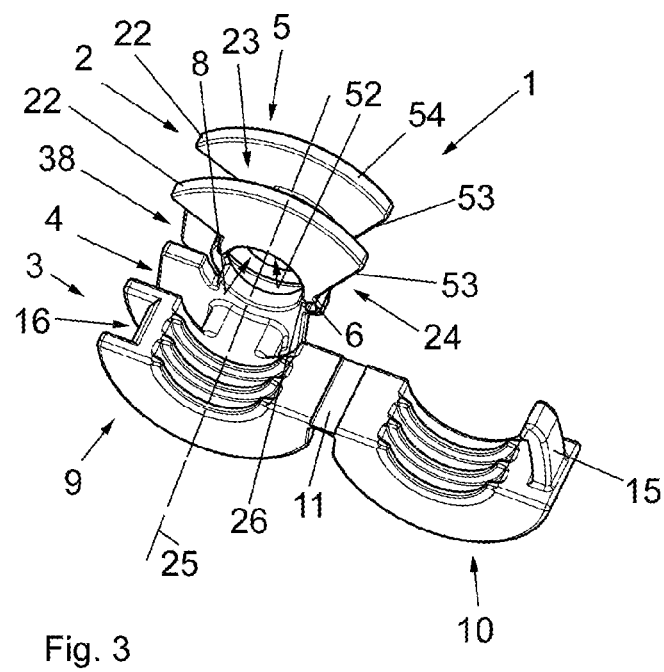
FIG. 3 shows the view of FIG. 1 with closed clamping collar means.

As evident from FIG. 3 and explained more in detail later with respect to FIG. 6, an access recess 24 is provided in the side walls 22 of each half-ring clamping element 4, 5. The access recess 24 is formed such that a side edge 54 of the side walls 21 is not directed radially to the center axis 25 of the partial clamping opening 7 and the partial fixing opening 12. This center axis 25 is a common axis for both partial clamping opening 7 and partial fixing opening 12 as well as the respective clamping opening 8 and fixing opening 13. The side walls 21 of the first and second half-ring clamping elements 4, 5 adjacent to the hinge 6 are arranged in an angle of about 70° with respect to an radial direction and the intersection of the radial direction with the wall 21 adjacent to the hinge. The angle is defined such that a part of the side wall 22 is cut away to build the access recess 24.

As the first hinge 6 is disposed at the axially directed edge of the partial clamping opening 7 of the two half-ring clamping elements 4, 5, this access recess 24 allows to fold a first half-ring clamping element 4 and a second half-ring clamping element 5 away from each other by an angle of about 180° as evident from FIG. 1. Accordingly, a clamping element 19 guided in the nut 23 will surround also the first hinge 6.

The clamping collar means 2 and the fixing collar means 3 are attached to each other by a connection web 27 connecting the first half-ring clamping element 4 and the first half-ring fixing element 9 such that the center axis 25 of the partial clamping opening 7 in the first half-ring clamping element 4 and the center axis of the partial fixing opening 12 in the first half-ring fixing element 9 are a joint (or in other words common) axes. The web 27 is connecting accordingly one side wall 22 of the clamping collar means 2 with an opposing side wall 28 of the fixing collar means 3.

By having a common center axis 25 of the partial clamping opening 7 and the partial fixing opening 12 of the first half-ring clamping element 4 and the first half-ring fixing element 9, also the clamping opening 8 and the fixing opening 13 have the same center axis 25. This allows introducing a cable 29 in a straight line into the strain relief element 1, as shown in FIG. 5.

Before describing this process in detail it is mentioned that not all reference signs are indicated in each and every figure of the drawing in order to enhance legibility of the drawing. The one skilled in the art is able to identify a reference sign indicated in one of the figures also in the other figures.

Figure 5:
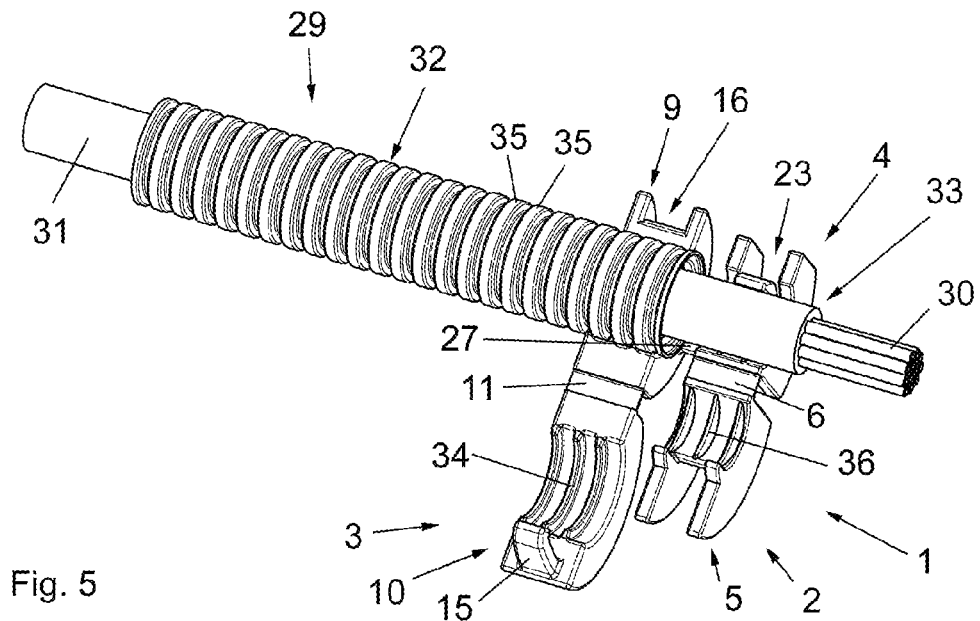
FIG. 5 shows a first mounting step of the strain relief element to a cable.

The cable 29 shown in FIG. 5 has a plurality of conductors 30, each covered by an insulating. A cable sheathing 31 is surrounding and fixing the insulated conductors 30. The cable sheathing 31 is shown as a plastic coating manufactured around the insulated conductors 30. However, the cable sheathing 31 in line with the invention might be any means for surrounding the plurality of conductors 30 and fixing them close to each other to form the cable.

Further, the cable 29 has a corrugated tube 32 surrounding the cable sheathing 31 along its longitudinal direction, i.e. along the cable axis, at least partially. Surrounding partially along the cable axis means that the cable sheathing 31 is protruding the corrugated tube 32 at least at one end 33 of the cable 29.

The stain relief element 1 is attached to this end 33 of the cable 29. To this aim, the cable 29 is laid into the first half-ring clamping element 9 and the first half-ring fixing element 9 such that a portion or part of the cable 29 with the cable sheathing 31 protruding the corrugated tube 32 is positioned in the partial clamping opening 7 of the first half-ring clamping element 4 and that a portion or part of the cable 29 with the corrugated tube 32 surrounding a cable sheathing 31 is positioned in the partial fixing opening 12 of the first half-ring fixing element 9. As the center axis 25 of the partial fixing opening 12 and the partial clamping opening 7 coincidences with each other, the cable direction or axis can simply follow this direction of the center axis 25.

Accordingly, the cable is inserted into the partial fixing opening 12 and the partial clamping opening 7 in a straight line. Then, the second half-ring fixing element 10 is folded around the second hinge 11 thereby fixing the first half-ring fixing element 9 and the second half-ring fixing element 10 to each other as already described. The closing force is executed by the fixing element 14.

In this position, the entire strain relief element 1 is fixed to the cable 29, as the fixing collar means 3 is attached to the corrugated tube 32. To this aim, ridges 34 in the surfaces of the partial fixing openings 12 fit into a nut defined between to crests 35 of the corrugated tube 32. This is shown in detail also in FIG. 11.

After this mounting step, the part of the cable sheathing 31 not surrounded by the corrugated tube 32 is already positioned in the clamping collar means 2 to apply the desired clamping force of the strain relief element 1. To this aim, in the following mounting step, the second half-ring clamping element 5 is folded around the first hinge 6 until the partial clamping opening 12 of the first and the second half-ring elements 4, 5 engage the cable sheathing 31. Similar to the ridges 34 in the surface of the partial fixing opening 12, there are provided ridges 36 in the surface of the partial clamping opening 7 to enhance the clamping force executed by the clamping element 19.

Figure 6:
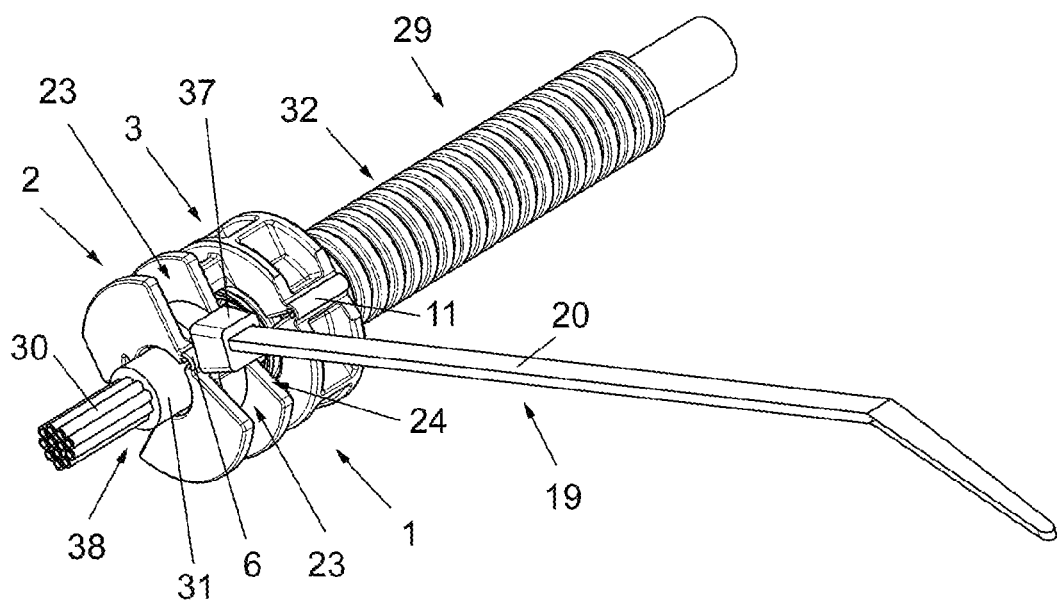
FIG. 6 shows a further mounting step of the of the strain relief element to the cable.

As evident form FIG. 6, the clamping element 19 can be an ordinary cable tie 20 that is arranged in the nut 23 such that a fastening element 37 of the cable tie 20 is positioned in the access recess 24 of the side walls 22 of the clamping collar means 2. This improves the handling of the clamping element 19 as the fastening element 37 of the cable tie 20 can be hold while pulling the open end of the cable tie 20 through the fastening element 37, thereby creating the clamping force. It is, thus, easy to apply the desired clamping force.

Figure 7:
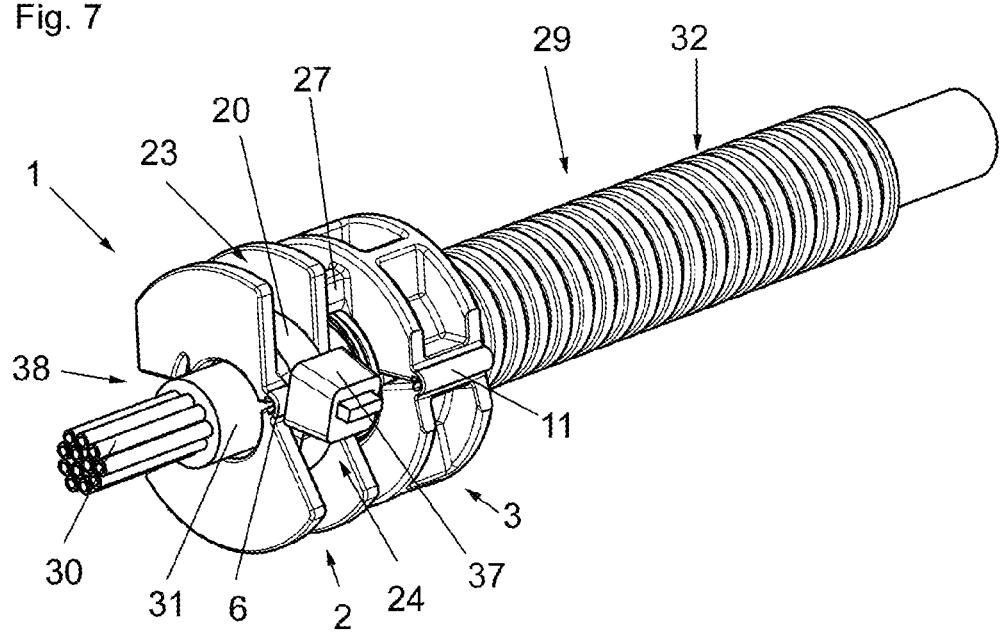
FIG. 7 shows a three-dimensional front view of the strain relief element according to FIG. 1 attached to the cable with a cutted cable tie.

After having fixed the cable tie 20 to the clamping collar means 2 of the strain relief element 1, the open end of the cable tie 20 protruding from the fastening element 37 can be easily cut off, as shown in FIG. 7. The cable tie 20 surrounding also the first hinge 6 protects this first hinge 6 against any force leading to a breakage of the first hinge 6.

Figure 8:
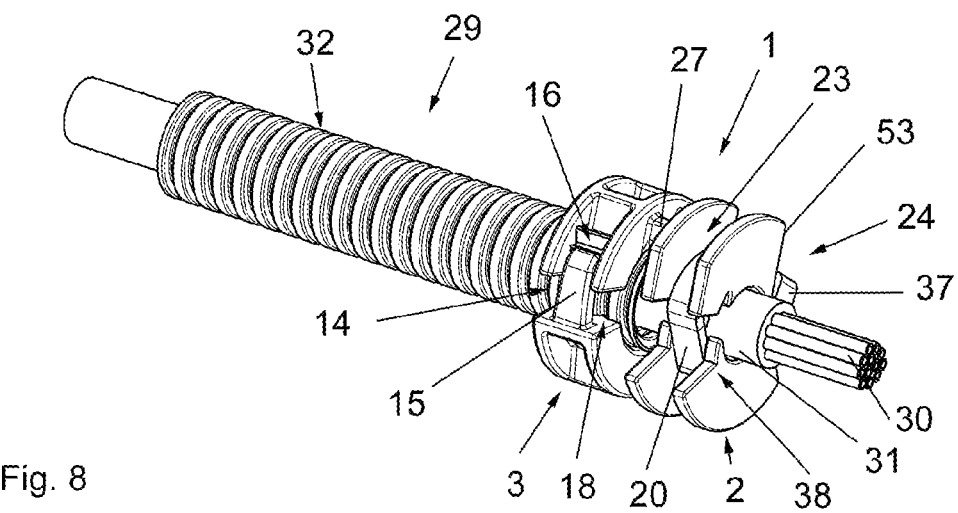
FIG. 8 shows a three-dimensional rear view of the strain relief element according to FIG. 7.

As evident from FIG. 8, there remains a gap 18 in the ring of the fixing collar means 3 as well as a gap 38 in the ring of the clamping collar means 2 when the corrugated tube 32 is axially fixed in the fixing collar means 3 and the cable sheathing 31 is clamped in the clamping collar means 2.

The cable 29 with the completely attached strain relief element 1 is shown in FIGS. 7 and 8. This entity of the cable 29 with the attached strain relief element 1 can be housed in a respective cavity for the strain relief element 1 in a plug 40 according to the proposed invention.

Figure 9:
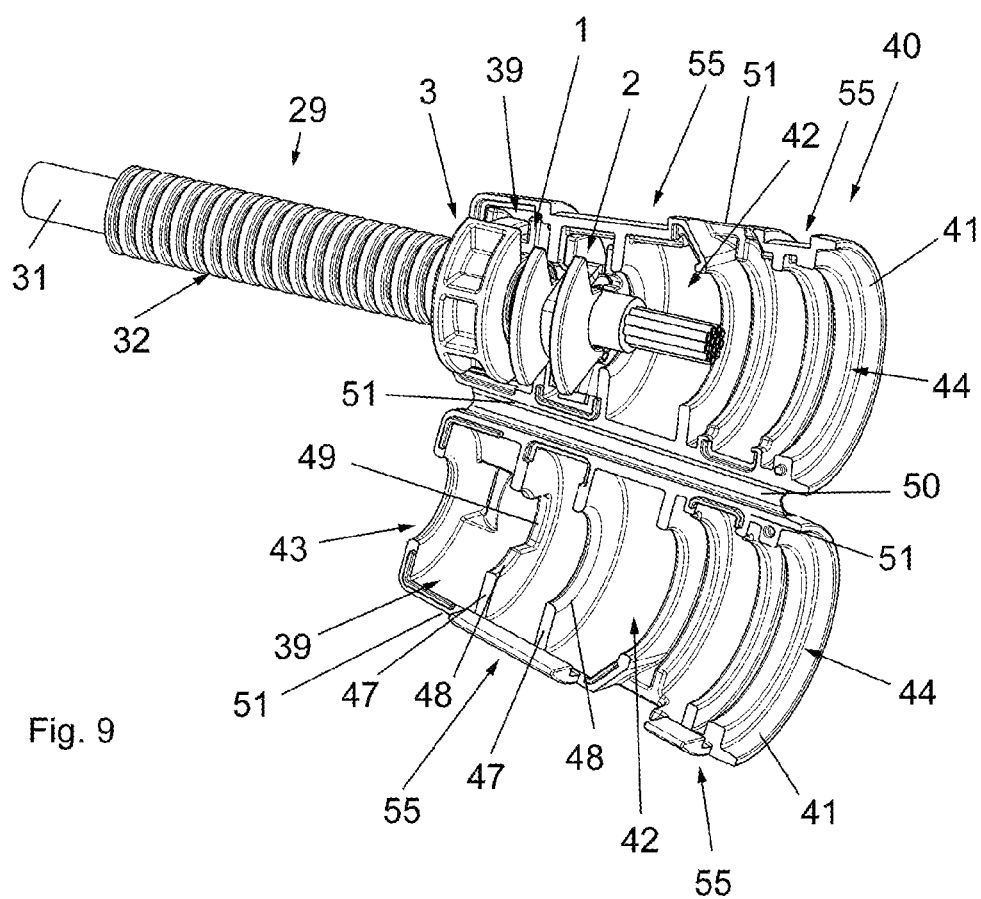
FIG. 9 shows a mounting step of the strain relief element attached to the cable as shown in FIGS. 7 and 8 in a plug according to a preferred embodiment of the invention.

As shown in FIG. 9, the plug 40 is composed of two half-body elements 41 attachable to each other during assembly of the plug 40. Each half-body element 41 has a partial cavity 39 for inserting a part of (in particular half of) the strain relief element 1 and a further partial cavity for a (not shown) electrical contact insert connected to the conductors 30 of the cable 29. This partial cavity is built in the half-body elements 41 where the cable 29 shown in FIG. 9 ends with the open insulated conductors 30.

When the two half-body elements 41 of the plug 40 are attached to each other, the strain relief element 1 and the contact insert are housed in the respective cavity formed by the partial cavities of the half-body elements 41.

Further, each half-body element 41 has a partial cable opening 43 and a partial connection opening 44 forming a cable opening 45 and a connection opening 46 when the two half-body elements 41 are attached to each other. The cable opening 45 and the connection opening 46 (and respectively the partial cable openings 43 and the partial connection openings 44) are disposed on opposing axial ends of the plug 40 and the half-body elements 41, respectively.

The strain relief element 1 attached to the cable 29 is axially fixed in a plug 40 by axial stoppers 47 disposed in the partial cavities 39 of the half-body elements 41 for the strain relief element 1. The axial stoppers 47 comprise a stopper recess 48 in the central axis 25 of the plug 40 for leading the cable 29 inside the plug 40. A further recess 49 is provided in one axial stopper 47 to engage with the connection web 27 of the strain relief element 1.

The two half-body elements 41 of the plug 40 are connected by a third hinge 50 disposed along one axial edge 51 of each half-body element 41. The body of the plug 40 can be assembled by folding the two half-body elements 41 together (around the third hinge 50) and fixing the two half-body elements 41 at each other with a snap fit 55 or the like.

Figure 10:
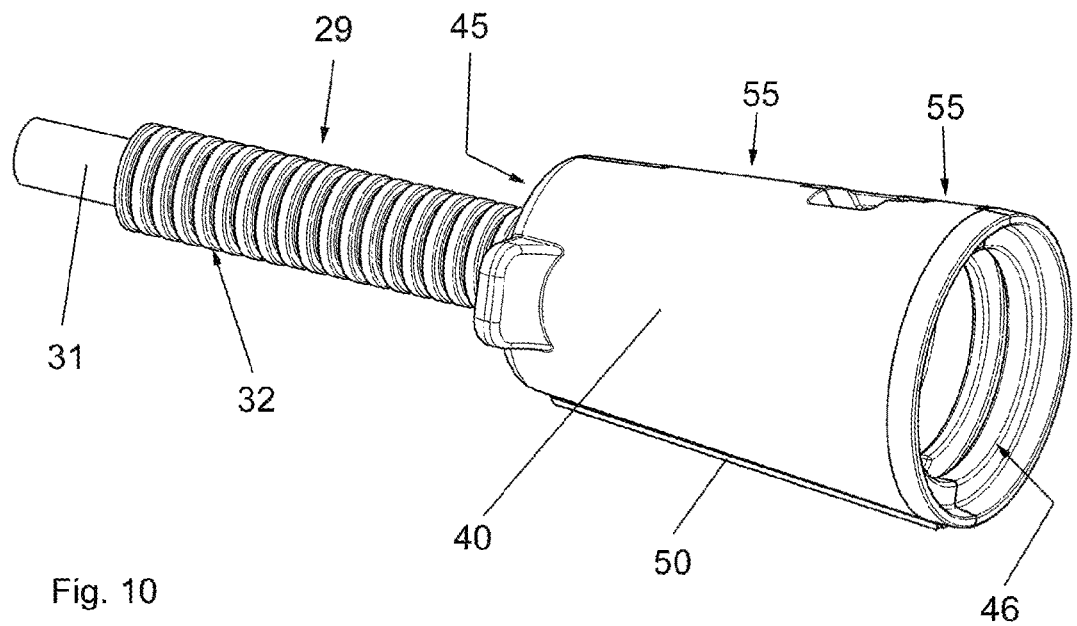
FIG. 10 shows a three-dimensional view of the completely assembled plug.
Figure 11:
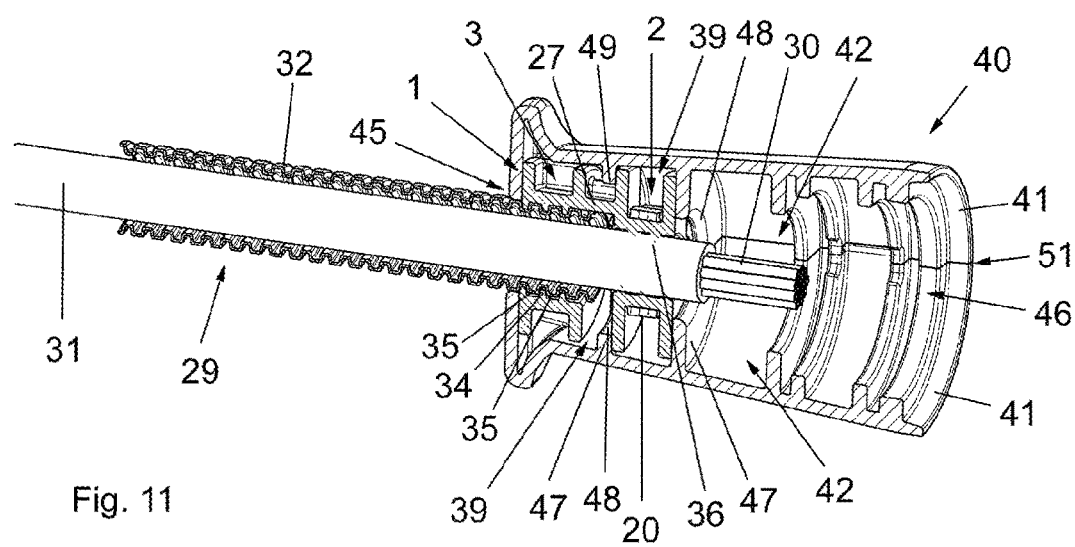
FIG. 11 shows a cross section through the plug and the strain relief element and a partial cross section through the cable.

The assembled plug 40 is shown in FIG. 10. FIG. 11 is a cross-section through the assembled plug 40 showing that the ridges 36 in the surface of the partial clamping opening 7 are penetrating the cable sheathing 31 of the cable 29 holding the cable sheathing 29 in an axially fixed position relative to the body of the plug 40 in the clamping collar means 2. The fixing collar means 3 only fixes the corrugated tube 32 of the cable 29 by engagement of the ridges 34 in the surface of the partial fixing opening 12 of the fixing collar means 3 into the nut between two crests 35 of the corrugated tube without generating a significant radial force leading to a deformation of the corrugated tube 32.

As explained in detail, the proposed strain relief element 1 in the tube 40 enhances the handling of a strain relief element 1 in a tube 40 significantly with respect to the prior art.

LIST OF REFERENCE SIGNS

1 strain relief element
2 clamping collar means
3 fixing collar means
4 first half-ring clamping element
5 second half-ring clamping element
6 first hinge
7 partial clamping opening
8 clamping opening
9 first half-ring fixing element
10 second half-ring fixing element
11 second hinge
12 partial fixing opening
13 fixing opening
14 fixing element
15 catch
16 notch
17 abutting face
18 gap in the ring of the fixing collar means
19 clamping element
20 cable tie
21 wall
22 side wall of clamping collar means
23 nut
24 access recess
25 center axis
26 axially directed edge of the partial clamping opening
27 connection web
28 side wall of fixing collar means
29 cable
30 conductors covered by an insulation
31 cable sheathing
32 corrugated tube
33 end
34 fixing ridge in the surface of the partial fixing opening
35 crest 36 clamping ridge in the surface of the partial clamping opening
37 fastening element
38 gap in the ring of the clamping collar means
39 partial cavity for strain relief element
40 plug
41 half-body elements of the plug
42 partial cavity for electrical contact insert
43 partial cable opening
44 partial connection opening
45 cable opening
46 connection opening
47 axial stopper
48 stopper recess
49 recess
50 third hinge
51 axial edge of the half-body elements 41 of the plug
52 inner edge of the side wall 22 of the clamping collar means
53 side edge of the side wall 22 of the clamping collar means
54 outer edge of the side wall 22 of the clamping collar means
55 snap fit

The invention claimed is:

1. A strain relief element for a cable comprising one or more conductors,
   wherein each conductor is covered by an insulating, and a cable sheathing is surrounding and fixing said at least one insulated conductor, said cable further comprising a corrugated tube surrounding the cable sheathing at least partially along its longitudinal direction,
   wherein said strain relief element comprises a clamping collar means in form of an at least partially closing ring for clamping said cable sheathing arranged in a clamping opening of the ring, said clamping collar means comprising a first and a second half-ring clamping element with a partial clamping opening each and hinged together through a first hinge, said clamping opening being defined by the two half-ring clamping elements folded towards each other and fixed with a clamping force executed by a clamping element,
wherein
   said strain relief element comprises a fixing collar means in form of an at least partially closing ring for fixing said corrugated tube arranged in a fixing opening of the ring, said fixing collar means comprising a first and a second half-ring fixing element with a partial fixing opening each and hinged together through a second hinge,
   said fixing opening being defined by the two half-ring fixing elements that are folded towards each other and fixed with a fixing force executed by a fixing element, and in that
   said clamping collar means and said fixing collar means are attached to each other by a connection web connecting the first half-ring clamping element and the first half-ring fixing element such that a center axis of the partial fixing opening in the first half-ring fixing element and the center axis of the partial clamping opening in the first half-ring clamping element are a joint axis.

2. The strain relief element according to claim 1, wherein the first hinge and the second hinge have the same bending direction.

3. The strain relief element according to claim 1, wherein the fixing element of the first and second half-ring fixing elements is a catch-notch-connection having a catch at one of the first or second half-ring fixing elements and a respective notch at the other of the first or second half-ring fixing elements.

4. The strain relief element according to claim 1, wherein fixing ridges are provided protruding from the surface of the partial fixing openings in the first and/or second half-ring fixing elements, wherein the direction of each fixing ridge preferably defines a plane perpendicular to the center axis of the partial fixing opening.

5. The strain relief element according to claim 1, wherein clamping ridges are provided protruding from the surface of the partial clamping openings in the first and/or second half-ring clamping elements wherein the direction of each clamping ridge preferably defines a plane perpendicular to the center axis of the partial clamping opening.

6. The strain relief element according to claim 1, wherein the clamping element is a cable tie.

7. The strain relief element according to claim 1, wherein the half-ring clamping elements are composed of a wall defining the partial clamping opening and two side walls directed essentially perpendicular thereto.

8. The strain relief element according to claim 1, wherein an access recess is provided in the side walls of one or each half-ring clamping element adjacent to the first hinge combining the first and the second half-ring clamping elements.

9. The strain relief element according to claim 1, wherein the first hinge is arranged at the axially directed edge of the partial clamping opening.

10. The strain relief element according to claim 1, wherein the first hinge and/or the second hinge are formed as an integral hinge.

11. The strain relief element according to claim 1, wherein the connection web is disposed between the first half-ring clamping element and the first half-ring fixing element adjacent to the partial clamping opening and partial fixing opening.

12. The strain relief element according to claim 1 wherein the strain relief element is injected molded in one single piece.

13. A plug for a cable comprising one or more conductors, each conductor being covered by an insulating and a cable sheathing surrounding and fixing said at least one insulated conductor, said cable further comprising a corrugated tube surrounding the cable sheathing along its longitudinal direction at least partially,
   with a body of the plug composed of two half-body elements attachable to each other, each half-body element comprising a partial cavity for inserting an electrical contact insert connected to the conductors of the cable and a partial cavity for inserting a strain relief element such that the contact insert and the strain relief element are housed in a cavity built by the partial cavities of the two half-body elements attached to each other and
   each half-body element comprising a partial cable opening and a partial connection opening forming a cable opening built by the partial cable openings and forming a connection opening built by the partial connection openings when the two half-body elements are attached to each other,
   wherein the partial connection openings and the partial cable openings of the half-body elements are disposed on opposing axial ends of the half-body elements,
wherein
   the plug comprises the strain relief element as claimed in claim 1 and at least one axial stopper disposed in the partial cavities of the half-body elements axially fixing the strain relief element inserted into the half-cavities of the half-body elements, wherein the axial stopper comprise a stopper recess in the central axis of the plug for conducting the cable.

14. The plug according to claim 13, wherein the two half-body elements of the plug are connected by a third hinge disposed along one axial edge of the two half-body elements.

15. The plug according to claim 13, wherein the two half-body elements comprise a snap fit to attach the axial edge of the half-body elements opposed to the third hinge with each other when the two half-body elements are folded around the third hinge towards to each other.

* * * * *